(12) United States Patent
Koppenhoehl et al.

(10) Patent No.: US 7,780,208 B2
(45) Date of Patent: Aug. 24, 2010

(54) LOCK ASSEMBLY FOR A VEHICLE HOOD

(75) Inventors: Juergen Koppenhoehl, Elchingen (DE); Kai Visel, Stuttgart (DE); Eberhard Weik, Weil der Stadt (DE)

(73) Assignee: Daimler AG, Stuttgart (DE)

( * ) Notice: Subject to any disclaimer, the term of this patent is extended or adjusted under 35 U.S.C. 154(b) by 1012 days.

(21) Appl. No.: 10/504,918

(22) PCT Filed: Feb. 8, 2003

(86) PCT No.: PCT/EP03/01265
§ 371 (c)(1),
(2), (4) Date: Mar. 14, 2005

(87) PCT Pub. No.: WO03/070529
PCT Pub. Date: Aug. 28, 2003

(65) Prior Publication Data
US 2005/0156442 A1    Jul. 21, 2005

(30) Foreign Application Priority Data
Feb. 19, 2002   (DE) ............................... 102 06 765

(51) Int. Cl.
E05B 17/02   (2006.01)

(52) U.S. Cl. .......... 292/340; 292/341.15; 292/DIG. 14; 292/121; 292/125

(58) Field of Classification Search ................. 292/340, 292/341.12, 341.13, 341.18, 341.15 X, 341.19, 292/DIG. 5, DIG. 14 X, 121 X, 125 X, 341, 292/DIG. 61
See application file for complete search history.

(56) References Cited

U.S. PATENT DOCUMENTS

| | | | | |
|---|---|---|---|---|
| 2,486,003 A | * | 10/1949 | Christensen | 292/59 |
| 2,508,090 A | * | 5/1950 | Beems et al. | 292/129 |
| 2,815,822 A | * | 12/1957 | Ramsey | 180/69.21 |
| 2,957,721 A | | 1/1958 | Sklaw et al. | |
| 3,003,800 A | * | 10/1961 | Hammond | 292/11 |
| 3,829,140 A | * | 8/1974 | Jehu et al. | 293/15 |
| 4,093,290 A | * | 6/1978 | Pearson | 293/15 |
| 5,213,380 A | * | 5/1993 | Thometschek et al. | 292/59 |
| 5,385,212 A | * | 1/1995 | Cady et al. | 180/69.21 |
| 6,254,150 B1 | * | 7/2001 | Hornemann et al. | 292/341.18 |
| 6,257,632 B1 | * | 7/2001 | Jung et al. | 292/341.18 |
| 6,394,211 B1 | * | 5/2002 | Palenchar et al. | 180/69.21 |
| 6,802,556 B2 | * | 10/2004 | Mattsson et al. | 296/187.09 |
| 6,817,637 B1 | * | 11/2004 | Anderson | 292/340 |

(Continued)

FOREIGN PATENT DOCUMENTS

DE    1 734 126    11/1956

(Continued)

OTHER PUBLICATIONS

Japanese Office Action w/English translation dated Jan. 30, 2007 (Four (4) pages).

*Primary Examiner*—Peter M. Cuomo
*Assistant Examiner*—Mark Williams
(74) *Attorney, Agent, or Firm*—Crowell & Moring LLP

(57) ABSTRACT

A hood lock assembly affording effective support in the closing direction of a vehicle hood is provided with flexibility, such that under a predefined overload, the hood is capable of additional movement in the closing direction beyond the normal closed position.

4 Claims, 1 Drawing Sheet

U.S. PATENT DOCUMENTS 7,416,228 B2 * 8/2008 Pfitzinger et al. ........... 292/216

FOREIGN PATENT DOCUMENTS

| | | | |
|---|---|---|---|
| DE | 1 844 936 | | 1/1962 |
| DE | 6926147 | | 7/1969 |
| DE | 197 21 565 | A1 | 5/1997 |
| DE | 199 22 455 | C1 | 5/1999 |
| DE | 199 63 853 | A1 | 12/1999 |
| DE | 100 34 523 | A1 | 7/2000 |
| DE | 101 02 760 | A1 | 1/2001 |
| EP | 1 146 185 | A2 | 4/2001 |
| JP | 51-57420 | A | 5/1976 |
| JP | 64-49557 | U | 3/1989 |
| JP | 2002-019641 | A | 1/2002 |
| JP | 2002-037129 | A | 2/2002 |
| WO | WO 00/69706 | | 11/2000 |

* cited by examiner

LOCK ASSEMBLY FOR A VEHICLE HOOD

This application claims the priority of German patent document 102 06 765.1, filed Feb. 19, 2002 (PCT International Application No. PCT/EP03/01265, filed Feb. 8, 2003), the disclosure of which is expressly incorporated by reference herein.

BACKGROUND AND SUMMARY OF THE INVENTION

The invention relates to a lock assembly for a vehicle hood.

In general it is desirable to design vehicle bodies in such a manner as to minimize the risk of injury to a pedestrian struck by the vehicle. Legislative provisions relating to this norm are to be anticipated in the future.

For the protection of pedestrians struck by vehicles, the vehicle body must be flexible enough to allow the impact surface struck by the pedestrian to be deformed, thereby absorbing the impact energy. Normally, this requirement can be met only if rigid structural parts of the vehicle body in typical impact areas are arranged at a sufficient interval from the deformable exterior of the vehicle body.

German patent document DE 199 22 455 C1 discloses a flexible arrangement of the hinges of a vehicle hood. In addition, German patent document DE 197 21 565 A1 suggests the use of sensors to monitor the area in front of the moving vehicle in order to detect an impending collision with a pedestrian. In such a case an actuator shifts a front hood into a sprung, raised latch position so as to create greater leeway for movement of the front hood in the ensuing impact.

An active system of similar function by means of which the front hood is raised into an elevated, sprung position when there is a risk of collision is also disclosed in German patent document DE 100 34 523 A1.

According to Japanese patent document JP 2002-19641 A, a counter-latch part fixed to a vehicle hood engages in latch parts of a lock assembly on the chassis side. The lock assembly housing is arranged on a chassis-side structural part in such a way that under excessive stressing of the hood it performs a swivel movement so that the hood is lowered beyond the normal closed position.

An assembly of similar function is demonstrated in Japanese patent document JP 2002-37129 A. Although in this case the chassis-side lock housing is immovably arranged on a chassis-side structural part, when the hood is overloaded in the closing direction, the lock elements interacting with the hood-side counter-latch part are pushed into a special position in which the hood likewise assumes a distinctly lower position compared to its normal closed position.

One object of the present invention is to afford good protection for pedestrians in the area of the lock assemblies of a vehicle body hood, using an especially simple design construction.

This and other objects and advantages are achieved by the lock assembly according to the invention, which is based on the general principle of employing hood-side measures to limit the support forces produced on the lock assembly in the event of an impact acting on the closed hood in the closing direction to a predefined design limit. Thus, in the event of a corresponding overload on the hood, there is also a large amount of travel available in the area of the lock assembly for the absorption of impact energy. The additional flexibility in the area of the lock assembly can be readily designed with a pronounced directional characteristic, in such a way that in the opening direction of the closed hood exceptionally large forces can be absorbed without deformation of the lock assembly and/or adjoining structural parts, while additional flexibility under additional stressing in the closing direction is possible given the comparatively small forces that typically occur in vehicle collisions with pedestrians. The additional flexibility should typically take effect when forces of approximately 1,000 N act in the closing direction in the lock area.

Other objects, advantages and novel features of the present invention will become apparent from the following detailed description of the invention when considered in conjunction with the accompanying drawings.

DETAILED DESCRIPTION OF THE DRAWINGS

Figure 1:
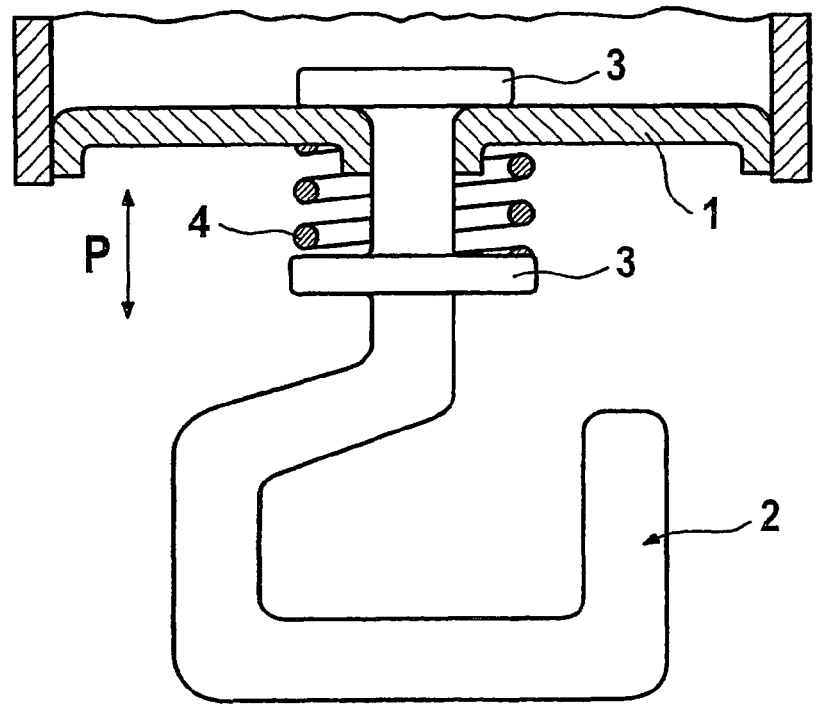
FIG. 1 shows a schematic representation of a first embodiment of the lock assembly according to the invention.

In the example in FIG. 1 a flanged plate 1 carries a lock hook 2, which interacts with latch parts (not shown) on chassis-side vehicle body parts in a fundamentally known manner. The flanged plate and lock hook are fixed to a structural part (not shown) of a vehicle hood (also not shown).

The lock hook 2 is arranged in an opening of the flanged plate 1 so that it is displaceable in the direction of the double arrow P, the possible displacement travel being limited by annular collars 3 on the lock hook 2.

A preloaded helical compression spring 4, arranged between the flanged plate 1 and the lower annular collar 3, biases the lock hook 2 in the normal position shown relative to the flanged plate 1. The preloading of the helical compression spring 4 is designed such that this normal position is maintained without alteration under normal closing operation of the vehicle hood and normal loads.

Only when a predefined overload is attained or exceeded can the helical compression spring 4 yield, so that the lock hook 2 is displaced upwards in the drawing in relation to the flanged plate 1. Such displacement typically occurs only when the vehicle collides with a pedestrian in such a way that the pedestrian stresses the vehicle hood heavily in the downward direction (that is, in the closing direction of the hood). Under such stressing, the lock hook 1 per se interacts with the chassis-side latch members so as to brace the vehicle hood counter to the impact direction of the pedestrian. The arrangement of the lock hook 2 such that it is displaceable against the force of the helical compression spring 4 permits the hood to perform an additional movement which goes distinctly beyond the normal closed position of the hood in the area of the lock assembly. According to the invention, therefore, additional mobility of the hood is ensured in such a way that impact energy can be absorbed through deformation.

Where necessary, the neck of the lock hook 2 may be of tapered design between the annular collars 3, such that the diameter of the neck widens towards the lower annular collar 3. If the lock hook 2 is arranged in a correspondingly narrow opening of the flanged plate 1, this opening is widened with corresponding friction as the lock hook 2 is displaced upwards in relation to the flanged plate 1, so that, in addition to the force of the helical compression spring 4, or instead of the force of the spring (which in this embodiment can also be dispensed with), an energy-absorbing resistance is generated for the movement of the lock hook 2 in relation to the flanged plate 1.

Figure 2:
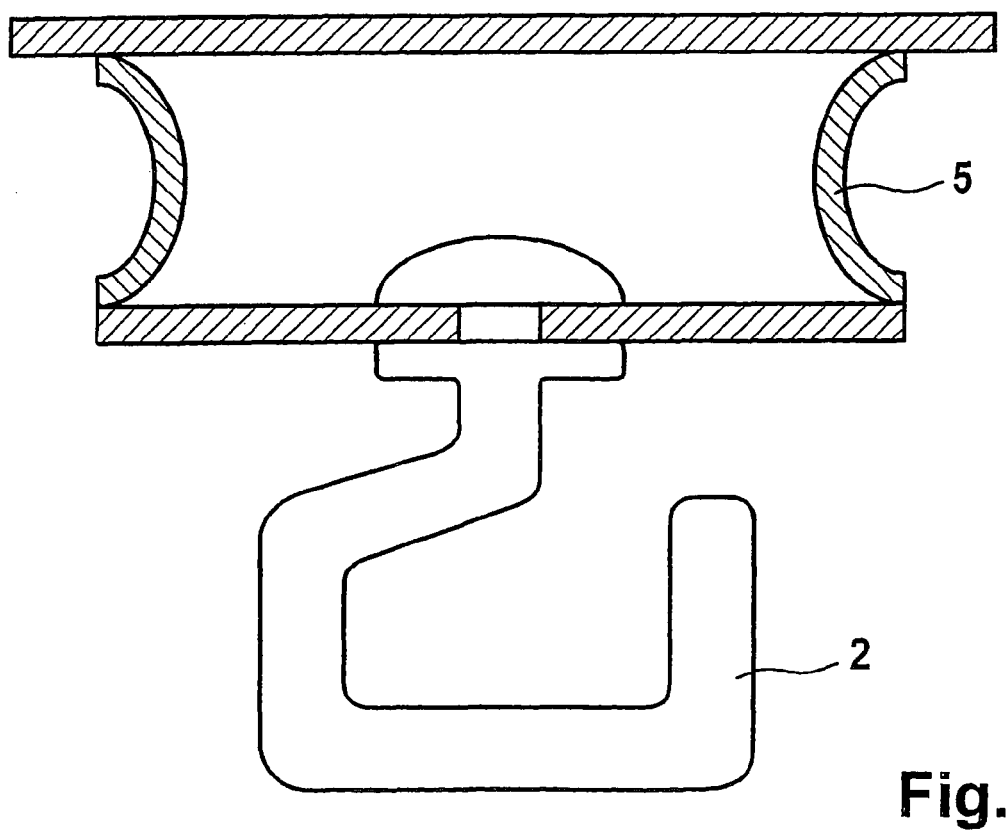
FIG. 2 shows a modified embodiment of the invention.

In the example in FIG. 2, the lock hook 2 is arranged on an impact-absorbing pad 5, which at a predefined overload in the compression direction is deformable under compression.

The invention is not limited to the embodiments represented in the drawing. In particular, it is possible to provide correspondingly flexible elements of the lock assembly on the chassis side in addition to or instead of the flexible arrangement of lock assembly elements on the hood side. Furthermore, the desired flexibility in the area of the lock assembly can in principle be afforded by any deformable or bendable components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A lock assembly for a vehicle hood having lock parts which provide effective support counter to a closing direction of the hood whenever the hood is in a normal closed position, said lock assembly comprising:
   - a retaining part configured to be fixedly mounted on the vehicle hood;
   - a first member which is one of a latch and a counter latch part that is displaceable supported on the retaining part and is configured to latchingly engage with a corresponding element situated on a body of said vehicle for retaining said hood in a closed position; and
   - a second member which is one of a preloaded spring and a deformable impact-absorbing pad, and which holds said first member in a normal support position relative to said retaining part when said vehicle hood is in said normal closed position; wherein,
   - support forces produced by said second member in the event of an impact acting on the closed hood in the closing direction are restricted to a predefined design limit;
   - in the event of a load which exceeds said support forces, the hood is moveable beyond said normal closed support position.

2. A latching arrangement for a vehicle hood, comprising:
   - a latch or counterlatch member for engaging with vehicle latching components to retain said hood in a normal closed position; and
   - a retaining assembly on which said latch or counterlatch member is displaceably supported, said retaining assembly being configured to be fixedly mounted on one of said vehicle hood and a body of said vehicle; wherein,
   - said retaining assembly comprises at least a deformable component which permits displacement of said latch or counterlatch member relative to said retaining assembly, out of said normal closed position of said hood, in said closing direction of said hood; and
   - said deformable component gives way in response to application of a load which exceeds a predetermined magnitude.

3. The latching arrangement according to claim 2, wherein said deformable component comprises a spring.

4. The latching arrangement according to claim 2, wherein said deformable member comprises an impact absorbing pad.

* * * * *